US009253019B1

United States Patent
Romanov et al.

(10) Patent No.: US 9,253,019 B1
(45) Date of Patent: Feb. 2, 2016

(54) FAULT TOLERANCE FOR AUTHENTICATION, AUTHORIZATION, AND ACCOUNTING (AAA) FUNCTIONALITY

(75) Inventors: Aleksey Romanov, Sutton, MA (US); Paul Raison, Windham, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 162 days.

(21) Appl. No.: 13/416,864

(22) Filed: Mar. 9, 2012

(51) Int. Cl.
*H04L 29/08* (2006.01)
*H04L 29/12* (2006.01)

(52) U.S. Cl.
CPC ...... *H04L 29/12509* (2013.01); *H04L 61/2567* (2013.01); *H04L 67/1008* (2013.01); *H04L 67/145* (2013.01)

(58) Field of Classification Search
CPC ..................... H04L 29/12509; H04L 61/2567; H04L 67/145; H04L 67/1008
USPC ......... 709/203, 217, 219, 223, 224, 225, 227, 709/228, 229
See application file for complete search history.

(56) References Cited

U.S. PATENT DOCUMENTS

| | | | |
|---|---|---|---|
| 2001/0028651 A1 | 10/2001 | Murase | |
| 2002/0046291 A1 | 4/2002 | O'Callaghan et al. | |
| 2003/0065812 A1 | 4/2003 | Beier et al. | |
| 2004/0044771 A1* | 3/2004 | Allred | H04L 29/125 709/227 |
| 2004/0085958 A1 | 5/2004 | Oman | |
| 2006/0184690 A1 | 8/2006 | Milliken | |
| 2006/0223497 A1* | 10/2006 | Gallagher | H04L 63/102 455/410 |
| 2007/0016666 A1 | 1/2007 | Duffield et al. | |
| 2007/0136331 A1 | 6/2007 | Hasan et al. | |
| 2008/0044181 A1 | 2/2008 | Sindhu | |
| 2008/0181217 A1 | 7/2008 | Sheppard et al. | |
| 2010/0118885 A1 | 5/2010 | Congdon | |
| 2010/0284405 A1 | 11/2010 | Lim | |
| 2011/0069632 A1 | 3/2011 | Chen et al. | |

(Continued)

FOREIGN PATENT DOCUMENTS

JP  2008011448 A  11/2009
WO  02076042 A1  9/2002

OTHER PUBLICATIONS

Rigney et al. "Remote Authentication Dial In User Server (RADIUS)" RFC 2865, Network Working Group, The Internet Society, Jun. 2000, 77 pgs.

(Continued)

*Primary Examiner* — Barbara Burgess
(74) *Attorney, Agent, or Firm* — Shumaker & Sieffert, P.A.

(57) ABSTRACT

An example network access device (NAD) includes a network interface to send and receive packets with an authentication, authorization, and accounting (AAA) server, and a subscriber management service unit (SMSU). The SMSU is configured to, responsive to determining that the AAA server is not reachable by the NAD, send a message from the NAD to the AAA server using the network interface, wherein the message directs the AAA server to send a discovery request message to the NAD, receive the discovery request message from the AAA server using the network interface, wherein the discovery request message includes a request for information about a plurality of subscriber sessions, and generate a discovery response message that includes information about at least a portion of the plurality of subscriber sessions, and send the discovery response message to the network access device using the network interface.

15 Claims, 5 Drawing Sheets

(56) References Cited

U.S. PATENT DOCUMENTS

2012/0233349 A1 9/2012 Aybay
2013/0007484 A1* 1/2013 Gobriel ............... G06F 1/3209
                                                    713/320

OTHER PUBLICATIONS

Rigney "RADIUS Accounting" RFC 2866, Network Working Group, The Internet Society, Jun. 2000, 28 pgs.

Calhoun et al. "Diameter Base Protocol" RFC 3588, Network Working Group, The Internet Society, Sep. 2003, 145 pgs.

U.S. Appl. No. 12/182,619, filed Jul. 30, 2008 entitled Streamlined Packet Forwarding Using Dynamic Filters for Routing and Security in a Shared Forwarding Plane.

U.S. Appl. No. 13/172,505, filed Jun. 29, 2011 entitled Variable-Based Forwarding Path Construction for Packet Processing Within a Network Device.

U.S. Appl. No. 13/248,825, filed Sep. 29, 2011, entitled High-Availability Mobile Gateways Having Interchassis Non-Uniform Service Unit Redundancy.

* cited by examiner

FAULT TOLERANCE FOR AUTHENTICATION, AUTHORIZATION, AND ACCOUNTING (AAA) FUNCTIONALITY

TECHNICAL FIELD

This disclosure relates to computer networks and, more particularly, to subscriber authentication, authorization, and accounting within computer networks.

BACKGROUND

Network service providers typically deploy one or more servers to manage authentication, authorization, and accounting (AAA) functionality for networks that offer services to one or more subscribers. The protocol most commonly used by the servers to communicate with clients is the Remote Authentication Dial In User Service (RADIUS) protocol. The RADIUS protocol is described in Carl Rigney et al., "Remote Authentication Dial In User Server (RADIUS)," Network Working Group of the Internet Engineering Task Force (IETF), Request for Comments 2865, June 2000, which is incorporated by reference herein in its entirety (referred to hereinafter as "RFC 2865").

To request access to a service, a subscriber connects to a network access server (NAS) that acts as a gateway to the service as provided by a service provider network (or the Internet). Often the NAS is a RADIUS client configured to communicate with a RADIUS server for the service provider network using the RADIUS protocol. As such, the NAS confirms that the subscriber is authentic and is authorized to access the service by requesting the RADIUS server to validate the access request from the subscriber. Upon validating an access request, the RADIUS server responds to the NAS with a RADIUS protocol message directing the NAS to accept the access request and establish a session enabling connectivity between the subscriber and the service provider network for the requested service.

The NAS may thereafter monitor and record statistics describing service usage by the subscriber. If configured to use RADIUS accounting, the NAS periodically outputs messages to communicate the statistics to a RADIUS accounting server using the RADIUS protocol. RADIUS accounting is described in Carl Rigney, "RADIUS Accounting," Network Working Group of the IETF, Request for Comments 2866, June 2000, which is incorporated by reference herein in its entirety (referred to hereinafter as "RFC 2866").

SUMMARY

In general, techniques are described for providing a fault tolerance mechanism that enables recovery from a loss of session data by a authentication, authorization, and accounting (AAA) server or other server-side device that provides AAA functionality for clients, e.g., a group of network access servers (NASes). In the server-side recovery process, the AAA server may recover session information from the group of NASes (i.e., the clients) using a bulk client state discovery mechanism. The AAA server may execute a bulk client state discover process that queries each NAS to recover client state information (i.e., session information) for clients connected to the respective NAS. The bulk client state discover mechanism may be initiated by the AAA server in response to a failure on the AAA server or may be initiated by any one of the group of NASes when a NAS detects that the AAA server has failed.

In one example, a method includes providing, with a network access device, network access to a plurality of subscribers upon authenticating the subscribers with an authentication, authorization, and accounting (AAA) server, and storing, within the network access device, information for subscriber sessions associated with the subscribers. The method also includes determining, with the network access device, that the AAA server is no longer reachable by the network access device, and, responsive to determining that the AAA server is not reachable by the network access device, sending a message from the network access device to the AAA server to direct the AAA server to send a discovery request message to the network access device. The method also includes receiving, with the network access device, the discovery request message from the AAA server, wherein the discovery request message includes a request for the information about one or more of the subscriber sessions, generating, with the network access device, a discovery response message that includes information about at least a portion of the plurality of subscriber sessions, and sending, with the network access device, the discovery response message to the AAA server.

In another example, a network access device includes one or more network interfaces to send and receive packets associated with a plurality of subscriber session, and a subscriber management service unit having a database of subscriber records to store subscriber information for the subscribers sessions upon authenticating the subscribers with an authentication, authorization, and accounting (AAA) server. The subscriber management service unit is configured to, responsive to determining that the AAA server is not reachable by the network access device, send a message from the network access device to the AAA server, wherein the message directs the AAA server to send a discovery request message to the network access device, receive the discovery request message from the AAA server using the network interface, wherein the discovery request message includes a request for information about a plurality of subscriber sessions, and generate a discovery response message that includes information about at least a portion of the plurality of subscriber sessions, and send the discovery response message to the AAA server using the network interface.

In another example, a computer-readable storage medium is encoded with instructions that cause one or more programmable processors to determine whether an authentication, authorization, and accounting (AAA) server is reachable by the network access device, and, responsive to determining that the AAA server is not reachable by the network access device, send a message to the AAA server, wherein the message directs the AAA server to send a discovery request message to the network access device. The instructions further cause the one or more programmable processors to receive the discovery request message from the AAA server, wherein the discovery request message includes a request for information about a plurality of subscriber sessions, generate a discovery response message that includes information about at least a portion of the plurality of subscriber sessions, and send the discovery response message to the AAA server.

In another example, a method includes receiving, with an authentication, authorization, and accounting (AAA) server, a request to initiate a subscriber session information discovery process, and generating, with the AAA server, a discovery request message that includes a search criterion and a discovery type, wherein the search criterion includes a value of a session identifier, and wherein the discovery type indicates a bulk-type discovery request message. The method further includes sending, with the AAA server and to a network access device, the discovery request message using the AAA protocol, wherein the network access device operates in accordance with an AAA protocol, receiving, with the AAA server, a discovery response message from the network access device using the AAA protocol, wherein the discovery response message includes session information about at least one session identified by the network access device based on the search criterion, and storing the session information in a database of the AAA server.

In another example, a authentication, authorization, and accounting (AAA) server includes one or more network interfaces that send and receive packets with a network access device, a database configured to store subscriber session information, and a control unit. The control unit is configured to receive a request to initiate a subscriber session information discovery process, generate a discovery request message that includes a search criterion and a discovery type, wherein the search criterion includes a value of a session identifier, wherein the discovery type indicates a bulk-type discovery request message, and wherein the discovery request message is configured in accordance with an AAA protocol, send the discovery request message to the network access device using the AAA protocol, and receive a discovery response message from the network access device using the AAA protocol, wherein the discovery response message includes session information about at least one session that matches the search criterion, and store, in the database, the session information included in the received discovery response message.

In another example, a computer-readable storage medium is encoded with instructions that cause one or more programmable processors of an authentication, authorization, and accounting (AAA) server to receive a request to initiate a subscriber session information discovery process, and generate a discovery request message that includes a search criterion and a discovery type, wherein the search criterion includes a value of a session identifier, and wherein the discovery type indicates a bulk-type discovery request message. The instructions further cause the one or more programmable processors to send the discovery request message to a network access device using the AAA protocol, wherein the network access device operates in accordance with the AAA protocol, receive a discovery response message from the network access device using the AAA protocol, wherein the discovery response message includes session information about at least one session identified by the network access device based on the search criterion, store the session information in a database of the AAA server.

The techniques may provide one or more advantages. For example, the techniques may provide a lightweight mechanism by which a AAA server may recover from a crash or loss of data at the AAA server. Rather than querying the NAS for all session information one session at a time, techniques of this disclosure may enable the AAA server to request a group of session information at once and may enable the NAS to send a group of session information in a single response, thereby reducing the number of requests and replies exchanged between the AAA server and each NAS. Further, by providing a lightweight mechanism for recovering session information when an AAA server crashes, service providers may provide less robust AAA services without losing data, thereby reducing financial costs and reducing administrative overhead.

The details of one or more embodiments are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
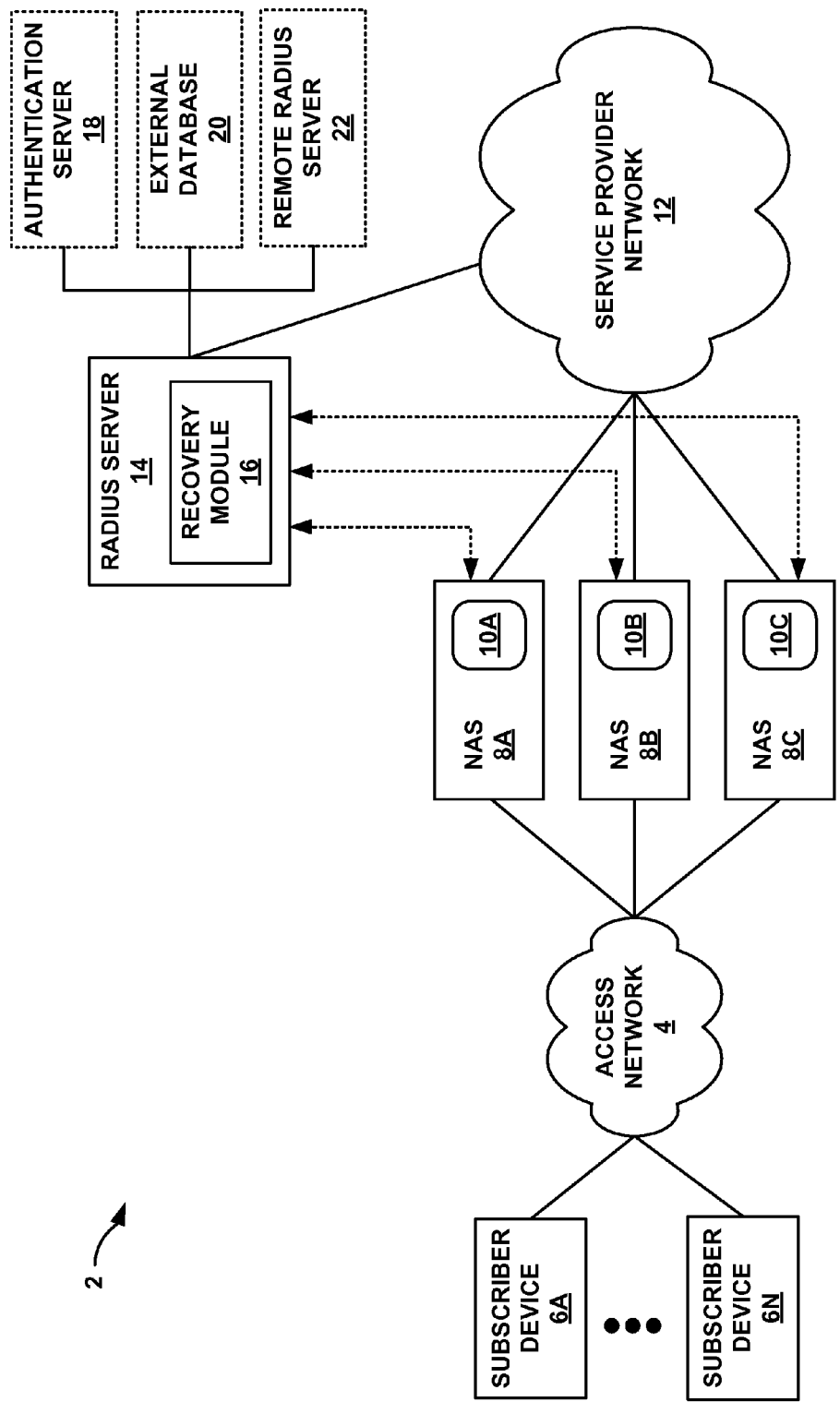
FIG. 1 is a block diagram illustrating a network system having a Remote Access Dial In User Service (RADIUS) server that supports a bulk client state discovery mechanism in accordance with techniques described in this disclosure.

FIG. 1 is a block diagram illustrating a network system 2 having a Remote Access Dial in User Service (RADIUS) server 14 that supports a bulk client state discovery mechanism in accordance with techniques described in this disclosure. In this example, network system 2 includes service provider network 12 coupled to access network 4 via network access servers (NASes) 8A-8C (collectively, "NASes 8").

Service provider network 12 supports one or more packet-based services that are available for request and use by subscriber devices 6A-6N (collectively, "subscriber devices 6"). As examples, service provider network 12 may provide Internet access, content delivery, voice over Internet protocol (VoIP), Internet Protocol television (IPTV), Short Messaging Service (SMS), Wireless Application Protocol (WAP) service, Telnet, or customer-specific application services. Service provider network 12 may include, for instance, a local area network (LAN), a wide area network (WAN), the Internet, a virtual LAN (VLAN), an enterprise LAN, a layer 3 virtual private network (VPN), an Internet Protocol (IP) intranet operated by a network service provider that also operates access network 4, an enterprise IP network, or some combination thereof. In various embodiments, service provider network 12 may be connected to a public WAN, the Internet, or to other networks. Service provider network 12 executes one or more packet data protocols (PDPs), such as IP (IPv4 and/or IPv6), X.25 or Point-to-Point Protocol (PPP), to enable packet-based transport of service provider network 12 services.

An administrator of service provider network 12 (a network service provider) deploys one or more of NASes 8 to function as one or more gateways to the service as provided by a service provider network. Accordingly, each of NASes 8 is a device or component (e.g., board or service card) within a device that provides access to service provider network 12. For example, each of NASes 8 may represent and/or incorporate a network access server that provides dial-up or virtual private network (VPN) services to an enterprise LAN, a remote access server (e.g., broadband remote access server)

or broadband services router that aggregates outputs from one or more Digital Subscriber Line Access Multiplexers (DSLAMs) into a higher-speed uplink to service provider network 12, a wireless access point (WAP) providing wireless physical layer access to service provider network 12, or switches that use other LAN-based (e.g., Ethernet) technologies to provide wired physical layer access to service provider network 12. One or more of NASes 8 may include a plurality of service cards that implement a decentralized control plane for subscriber management. Example network gateways having a decentralized control plane are described in U.S. patent application Ser. No. 13/248,825, entitled HIGH-AVAILABILITY MOBILE GATEWAYS HAVING INTERCHASSIS NON-UNIFORM SERVICE UNIT REDUNDANCY, filed Sep. 29, 2011, the entire contents of which being incorporated herein.

Subscriber devices 6 connect to NASes 8 via access network 4 to receive connectivity to service provider network 12 services for applications hosted by subscriber devices 6. Each of subscriber devices 6 may represent, for example, a workstation, desktop computer, laptop computer, cellular or other mobile device, Personal Digital Assistant (PDA), gaming console, television set-top box, smart phone, tablet computer, or any other device capable of accessing a computer network via a wireless and/or wired connection. Each of subscriber devices 6 may be associated with a subscriber (e.g., a human). Applications that access services provided by service provider network 12 may alternatively be referred to as "user agents." In this example, any of subscriber devices 6 may connect to any of NASes 8 in order to access service provider network 12.

A network service provider (or other entity that administers service provider network 12) operates or in some cases leases elements of access network 4 to provide packet transport between subscriber devices 6 and NASes 8. Access network 4 may include a broadband access network, cellular access network, a wireless LAN, a public switched telephone network (PSTN), or other type of access network. In examples of network system 2 that include a cellular access network as access network 4, any of NASes 8 may represent a mobile gateway, for example, a Gateway General Packet Radio Service (GPRS) Serving Node (GGSN), an Access Gateway (aGW), or a Packet Gateway (P-GW). Access network 4 may include a plurality of service virtual LANs (SVLANs) that partition elements of access network (e.g., DSLAMs) into logically different networks. Different subscriber devices 6 may therefore connect to NASes 8 using different SVLANs.

The elements of access network 4 may support any one or more of a variety of protocols, such as Internet Protocol (IP), Frame Relay, Asynchronous Transfer Mode (ATM), Ethernet, Point-to-Point Protocol (PPP), Point-to-Point Protocol over Ethernet (PPPoE), GPRS tunneling protocol (GTP), and virtual local area network (VLAN)-related protocols, among others. Using any one or more of these protocols, any of subscriber devices 10 may present authentication credentials to one or more of NASes 8 to request access to a service provider network 12 service. For example, subscriber device 6A may broadcast credentials, such as a username and password, to each of NASes 8 to request access to a service provided by service provider network 12. Subscriber devices 6 may broadcast credentials using, for instance, a PPPoE Active Discovery Initiation (PADI) packet to each of NASes 8. In some instances, each of subscriber devices 6 is logically associated with one of NASes 8 and unicasts credentials directly to the associated NAS 8 to request a service. In some examples, subscriber device 6A may be assigned a specific interface on one of NASes 8 (e.g., NAS 8A) such that the subscriber is authenticated based on the interface on which network traffic is sent and received rather than on a username and password.

Each service provided by the active NAS 8 to a subscriber may constitute a communication session, with the beginning of the session defined as the moment when service is first established and the end of the session defined as the moment when service is terminated. A subscriber may have multiple sessions, such as TCP communication sessions, concurrently. The active NAS 8 for a partition (e.g., VLAN) stores session context information for corresponding subscriber sessions to a corresponding one of active session contexts 10A-10C (collectively, "active session contexts 10") for the NAS. For example, NAS 8A stores subscriber session contexts to active session contexts 10A.

Each of active session contexts 10 includes one or more subscriber session contexts for subscriber sessions actively managed by the active NAS 8. A subscriber session context in any of active session contexts 10 for a subscriber session stores session context information, such as the IP address allocated to the subscriber, the Access Point Name (APN) for the service, a Network Service Access Point Identifier (NSAPI) for the service session, forwarding information, charging information for accounting records, one or more quality of service (QoS) profiles for the subscriber, and/or a subscriber IMSI or other mobile subscriber identity.

NASes 8 are configured by the network service provider (or other administrative entity) as RADIUS clients that outsource authentication, authorization, and accounting (AAA) functions to a specified RADIUS server 14, a device that receives and processes connection requests or accounting messages sent by any of NASes 8. While described herein as using the RADIUS protocol, NASes 8 and RADIUS server 14 may be configured to use other network protocols, including the Diameter protocol and extensions thereof, to exchange authentication, authorization, accounting, and other information. The Diameter protocol is described in P. Calhoun et al., "Diameter Base Protocol," Request for Comments 3588, September 2003, which is incorporated by reference herein in its entirety (referred to hereinafter as "RFC 3588"). Authentication is the process of verifying a subscriber identity. Authorization is the process of determining whether and the form in which an authenticated subscriber has access to service provider network 12. Accounting is the process of generating records of session statistics for subscribers for billing and monitoring, for example.

When an active NAS 8 for a subscriber receives authentication credentials from the subscriber in an request to access service provider network 12 services, the active NAS 8 sends a RADIUS protocol Access-Request to RADIUS server 14 containing attributes such as the subscriber user name and password, an identifier for the active NAS 8 (e.g., the "NAS-ID"), the active NAS 8 network address, and the Port ID the subscriber is accessing. If RADIUS server 14 contains a configuration record for the subscriber that confirms the authorization credentials, RADIUS server 14 returns a RADIUS protocol Access-Accept message to the active NAS 8. If a match is not found or a problem is found with the authentication credentials, the server returns an Access-Reject message. The active NAS 8 then establishes or terminates the user's connection. The active NAS 8 may then forward accounting information to RADIUS server 14 to document the transaction. RADIUS server 14 may store or forward this information to support billing for the services provided.

In some examples, RADIUS server 14 may outsource some AAA functionality to one or more backend servers, such as authentication server 18, external database 20, and remote RADIUS server 22. These backend servers are illustrated in FIG. 1 with dashed lines to indicate RADIUS server 14 may or may not, in various examples, use AAA services provided by the backend servers. Authentication server 18 is a backend authentication server, such as an RSA SecurID system, a Structured Query Language or Lightweight Directory Access Protocol (LDAP) database server, or Home Location Register, that stores is a list of subscriber accounts and subscriber account properties that can be checked by RADIUS server 14 to verify authentication credentials and queried by RADIUS server 14 to obtain subscriber account properties containing authorization and connection parameter information for subscribers. In some cases, authentication server 18 verifies authentication credentials on behalf of RADIUS server 14. External database 20 is a backend database that RADIUS server 14 may use to store accounting information. In some cases, RADIUS server 14 is a proxy server for remote RADIUS server 22.

RADIUS server 14 stores (internally or using external database 20, for example) session information in session records for respective subscriber sessions established by NASes 8. Session records include information received from NASes 8 in RADIUS request messages, such as RADIUS Accounting-Request and/or Access-Request messages. For example, a session record for a session established by NAS 8A may include a subscriber user name, a NAS-IDentifier value for that uniquely identifies NAS 8A to RADIUS server 14, a NAS 8A network address (e.g., an IPv4 or IPv6 address), an accounting session identifier that uniquely identifies the session on NAS 18A (e.g., "Acct-Session-Id" described in RFC 2866), and accounting information (e.g., input or output octets/packets for the session, timing information).

From time to time, one of NASes 8 and/or RADIUS server 14 may be unavailable for processing subscriber logins and logouts, enforcing various policies, or performing other subscriber and network management tasks. In examples where one of NASes 8 crashes (e.g., NAS 8A), NAS 8A queries RADIUS server 14 to recover the subscriber session information. However, the success of recovering the session information depends upon RADIUS server 14 not crashing. In examples where RADIUS server 14 crashes, RADIUS server 14 may poll each of NASes 8 for all sessions known to RADIUS server 14 one session at a time to determine which sessions are missing (i.e., which sessions terminated while RADIUS server 14 was unavailable). Polling each of NASes 8 for the session information one session at a time very time intensive and computationally expensive. Further, using this technique, RADIUS server 14 may only poll NASes 8 for sessions having information stored at RADIUS server 14 and may not be able to recover session information for session that do not have information stored at RADIUS server 14.

In accordance with techniques of this disclosure, RADIUS server 14 includes recovery module 16 that provides a bulk client state discovery mechanism. Recover module 16 enables RADIUS server 14 to issue a bulk request for session information to one or more of NASes 8 to recover session information for one or more subscriber sessions. Should RADIUS server 14 crash, be replaced, or otherwise lose connectively with one or more of NASes 8, recovery module 16, upon connectivity to NASes 8 being restored, issues a client state discovery command to one or more of NASes 8. The client state discovery command may request all session information stored at each respective NAS 8 or a subset of the session information, whether or not RADIUS server 14 currently stores information about each session. That is, techniques of this disclosure enable RADIUS server 14 to request session information in bulk and retrieve session information for sessions not already "known" to RADIUS server 14.

In one embodiment, RADIUS server 14 is configured as a policy and charging rules function (PCRF) device and each of NASes 8 is configured as a policy and charging enforcement function (PCEF) device, as defined by the $3^{rd}$ Generation Partnership Project (3GGP) standard. RADIUS server 14 and each of NASes 8 may exchange packets formatted or otherwise configured in accordance with the Diameter protocol. In particular, when implementing techniques of this disclosure, the packets exchanged between RADIUS server 14 and one or more of NASes 8 may configured in accordance with the Gx interface for the Diameter protocol.

In examples where the bulk client state discovery techniques are implemented using RADIUS, two previously unassigned RADIUS Packet Type Code values may be assigned such that the values identify packets that request client state information and packets that are sent in response to the request. The Packet Type Code values are included in a Packet Type Code parameter of each RADIUS packet. Each of the newly assigned RADIUS Packet Type Code values may be one of the currently unassigned Packet Type Code values (e.g., one of 52-249). For example, when requesting session information from a NAS 8 in accordance with techniques of this disclosure, RADIUS server 14 sends a request message to the respective NAS 8 (e.g., NAS 8A) that includes a new RADIUS Packet Type Code value that identifies the message as a discovery request message that requests the client state information from the respective NAD 8. The discovery request message, in one example, includes at least a session identification parameter and a discovery type parameter. The session identification parameter identifies a unique session that is created for the recovery of client state (i.e., session) information from NAS 8A. In one example, the discovery type parameter may be set to a value that corresponds to one of three different discovery options. First, the discovery type parameter may be set to a value that corresponds to an "exact" discovery type, which causes NAS 8A to return information about a client state or session that is specified in the discovery request message. Second, the discovery type parameter may be set to a value that corresponds to a "done" discovery type, which indicates that RADIUS server 14 completed all discovery operations. Third, the discovery type parameter may be set to a value that corresponds to a "bulk" discovery type, which causes NAS 8A to return information about one or more client states or sessions based on search criteria. For example, NAS 8A may return information for all client states or session having session identifiers that are lexicographically greater than a search string included in the discovery request.

The one or more of NASes 8 that receives the discovery request from RADIUS server 14 (e.g., NAS 8A), generates a discovery response message based on the received discovery request message. The discovery response message includes a RADIUS Packet Type Code value that identifies the response message as a discovery response message that may include session information. The discovery response message specifies a session identifier that corresponds to the session identifier included in the discovery request message, a search criterion, and a result code. As one example, the search criterion may specify a session identifier for a session that is maintained by NAS 8A. When the discovery request message includes a discovery type of "exact," NAS 8A returns information for the session that has a session identifier that matches the search criterion.

When the discovery request message specifies a discovery type of "bulk," the discovery response message may include session information for as many sessions that fit in a single discovery response message and that meet the search criteria (e.g., that are lexicographically greater than the search string included in the discovery request message). In some instances, all of the session information that meets the search criterion will fit in a single discovery response message and NAS 8A includes all of the matching session information in the discovery response message, sets the result code to a value that indicates "success" (i.e., that the discovery request completed successfully by being able to response with complete session information) and sends the response message to RADIUS server 14. In other instances, more session information meets the search criteria than will fit in a single discovery response message. When more session information meets the search criteria than will fit in a single discovery response message, NAS 8A includes as much session information as will fit in a single discovery response message, sets the result code to a value that indicates "limited success" (i.e., that the discovery request was partially successful, but that there is more session information available that matches the query) and sends the response message to RADIUS server 14. In some instances, NAS 8A may encounter a communication problem or some other issue that prevents NAS 8A from retrieving the requested session information. In these instances, NAS 8A sets the result code to a value that indicates "failed" (i.e., that the discovery request did not complete successfully) and sends a discovery response message to RADIUS server 14.

RADIUS server 14 receives the discovery response message from NAS 8A and processes the included session information. When the result code included in the discovery response message indicates "success," RADIUS server 14 may send, to NAS 8A, a discovery request message having the discovery type field set to "done" in order to notify NAS 8A that the client state discovery process is complete. When the result code included in the discovery response message indicates "failed," RADIUS server 14 may generate and send a discovery request message that includes the same search criterion as was sent in the previous discovery request message. That is, RADIUS server 14 may attempt to recover the same session information as was specified in the previous discovery request that resulted in a discovery response having a "failed" result code.

When the result code included in the discovery response message indicates "partial success," RADIUS server 14 processes the session information included in the discovery response message and generates a new discovery request message. The new discovery request message is based on the previous discovery request message, but includes a different search criterion. In the new discovery request message, the search criterion is set to the session identifier for the last session having information included in the received discovery response message. For example, if information about sessions having session identifiers of one through four is included in the received discovery response message, RADIUS server 14 generates a new discovery request messaging having a discovery type of "bulk" and a search criterion of "four." Because, in this example, NAS 8A is configured to return information about sessions having session identifiers lexicographically greater than the search criterion (i.e., greater than four), NAS 8A will return session information for any sessions that have a session identifier greater than four, up to the maximum number of sessions that may have session information included in a single discovery response message. While one example is provided, one of ordinary skill in the art may readily apply other identifier and search criterion matching techniques known in the art to achieve similar results.

In some embodiments, each NAS 8 may exchange keep-alive messages to RADIUS server 14 in order to enable RADIUS server 14 to determine if one or more of NASes 8 becomes unavailable and to enable each of NASes 8 to determine if RADIUS server 14 becomes unavailable. If one of NASes 8 (e.g., NAS 8A) determines that RADIUS server 14 is unavailable, NAS 8A may trigger RADIUS server 14 to initiate the client state discovery mechanism described above. In one example, each keep-alive message sent from NAS 8A to RADIUS server 14 includes an origin state identifier field. When the keep-alive messages are being actively exchanged (i.e., NAS 8A is receiving a response to each keep-alive message sent to RADIUS server 14), the origin state identifier field maintains the same value. However, if NAS 8A does not receive a response to a keep-alive message and determines that RADIUS server 14 is unavailable (e.g., crashed), NAS 8A changes the value of the origin state identifier field included in the next keep-alive message. Once connectivity is restored to RADIUS server 14, RADIUS server 14 detects the changed origin state identifier value and begins the bulk client state discovery process. In this manner, each of NASes 8 may initiate the bulk client state discovery mechanism in response to determining that RADIUS server 14 is unavailable.

Figure 2:
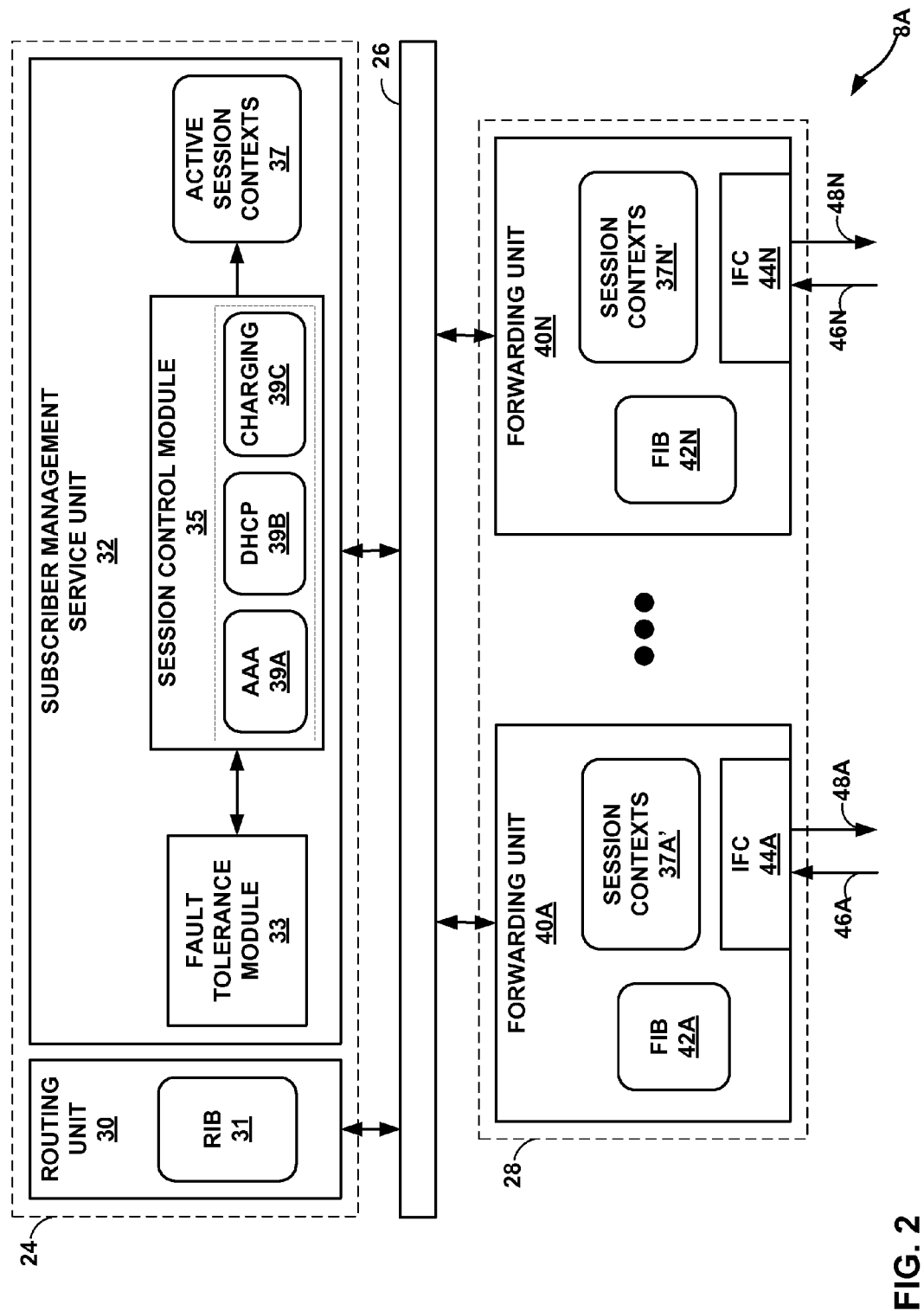
FIG. 2 is a block diagram illustrating an example instance of a network access server of FIG. 1 that supports a bulk client state discovery mechanism according to techniques described herein.

FIG. 2 is a block diagram illustrating an example instance of a network access server of FIG. 1 that supports a bulk client state discovery mechanism according to techniques described herein. In this example, NAS 8A is divided into two logical or physical "planes" to include a first control plane 24 and a second "data" or "forwarding" plane 28. That is, NAS 8 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 24 is a decentralized control plane in that control plane functionality is distributed among routing unit 26 and one or more subscriber management service units 32. Similarly, data plane 28 in this example is a decentralized data plane in that data plane functionality and packet forwarding functionality is distributed among a plurality of forwarding units 40A-40N ("forwarding units 40"). Each of routing unit 30, subscriber management service units 32, and forwarding units 40 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, each of routing unit 30, subscriber management service units 32, and forwarding units 40 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Switch 26 couples routing unit 30, subscriber management service unit 32, and forwarding units 40 to deliver data units and control messages among the units. Switch 26 may represent an internal switch fabric or cross-bar, bus, or link. Examples of high-speed multi-stage switch fabrics used as a forwarding plane to relay packets between units within a router are described in U.S. Patent Application 2008/0044181, entitled MULTI-CHASSIS ROUTER WITH MULTIPLEXED OPTICAL INTERCONNECTS. The entire contents of U.S. Patent Application 2008/0044181 are incorporated herein by reference.

Routing unit 30 executes the routing functionality of NAS 8A. In this respect, routing unit 30 represents hardware or a combination of hardware and software of control that implements routing protocols (not shown in FIG. 2) by which routing information stored in a routing information base 31 ("RIB 31") may be determined. RIB 31 may include information defining a topology of a network, such as service provider network 12 of FIG. 1. Routing unit 30 may resolve the topology defined by routing information in RIB 31 to select or determine one or more routes through the network. Routing unit 30 may then update data plane 28 with these routes, where forwarding units 40 of data plane 28 store these routes as respective forwarding information bases 42A-42N ("FIBs 42"). Further details of one example embodiment of a router can be found in U.S. patent application Ser. No. 12/182,619, filed Jul. 30, 2008 entitled "STREAMLINED PACKET FORWARDING USING DYNAMIC FILTERS FOR ROUTING AND SECURITY IN A SHARED FORWARDING PLANE," which is incorporated herein by reference.

Data plane (alternatively, "forwarding plane") 28 represents hardware or a combination of hardware and software that forward network traffic in accordance with forwarding information. In the example of NAS 8A of FIG. 2, data plane 28 includes forwarding units 40 that provide high-speed forwarding of network traffic received by interface cards 44A-44N ("IFCs 44") via inbound links 46A-46N to outbound links 48A-48N. Forwarding units 40 may each comprise one or more packet forwarding engine ("PFE") coupled to respective interface cards 44 and may represent, for example, a dense port concentrator (DPC), modular port concentrator (MPC), flexible physical interface card (PIC) concentrator (FPC), or another line card, for example, that is insertable within a NAS 8A chassis or combination of chassis.

Each of forwarding units 40 may include substantially similar components to perform substantially similar functionality, said components and functionality being described hereinafter with respect to forwarding unit 40A. Forwarding unit 40A includes a request delegation module 42A that receives session requests via IFC card 44A and delegates the session requests to subscriber management service unit 32.

As control plane anchors for subscriber sessions, service unit 32 handles configuration of forwarding units 40 for constructing subscriber-specific forwarding paths for processing and forwarding data traffic from the mobile devices. For example, service unit 32 may program session contexts 37 to forwarding units 40 for storage in respective session contexts 37A'-37N' ("session contexts 37'"). Forwarding unit 40A, for instance, receives user packets, maps the user packets to a session context in session contexts 37', and apply forwarding constructs to forward the user packets according to the session context data. For example, forwarding of downstream user packets by forwarding unit 40A for a particular session may include encapsulating the user packets using the GPRS Tunneling Protocol (GTP) and setting the specified downstream TEID for the session within a GTP header. Example details on subscriber management units constructing subscriber-specific forwarding paths within forwarding units 40 can be found in U.S. patent application Ser. No. 13/172,505, entitled "VARIABLE-BASED FORWARDING PATH CONSTRUCTION FOR PACKET PROCESSING WITHIN A NETWORK DEVICE," filed Jun. 29, 2011, the entire contents being incorporated herein by reference.

Subscriber management service unit 32 of control plane 25 presents a uniform interface to subscriber devices and provides decentralized service session setup and management for NAS 8A. Subscriber management service unit 32 may represent, for example, a packet forwarding engine (PFE) or a component of physical interface card insertable within a chassis of NAS 8A. The physical interface card may be, for instance, a multi-services dense port concentrator (MS-DPC). Subscriber management service unit 32 may also represent a co-processor executing on a routing node, such as routing unit 30. Subscriber management service unit 32 may be alternatively referred to as a "service PIC" or "service card."

Session control module 35 establishes subscriber sessions requested by an access network serviced by NAS 8A and manages the sessions once established. Session control module 35 stores session data, received in control plane protocol messages received by session control module 35 or allocated by session control module 35, for one or more sessions managed by service unit 32 in session contexts 37. Service unit 32 may be referred to as the anchoring service unit for sessions stored in session contexts 37 in that service unit 32 stores control and forwarding information needed to manage the sessions. A session context stored in session contexts 39 for a session in which a device participates may include, for example, the PDP address allocated for the wireless device for use in sending and receiving user packets, routing information used by service unit 32 in forwarding user packets such as tunnel endpoint identifiers (TEIDs) and identifiers/addresses for downstream nodes, the APN for the session, and quality of service (QoS) profiles.

Session control module 35 executes an authentication, authorization, and accounting (AAA) module 39A, a dynamic host configuration protocol (DHCP) module 39B, and a charging protocol module 39C for communication, for example, with a policy charging rules function (PCRF) entity (e.g., RADIUS server 14). Subscriber management service unit 32 may independently execute control plane protocols required to establish a requested session for a subscriber, including the RADIUS protocol or Diameter protocol executed by AAA module 39A. In this sense, subscriber management service unit 32 provides a form of a decentralized control plane for managing subscriber communication sessions for particular subscribers that are anchored to service unit. NAS 8A may include a plurality of subscriber management service units 32, each providing control plane functions to different subscriber communication sessions. As a result, NAS 8A may achieve increased scalability to handle thousands or millions of concurrent communication sessions for subscriber devices.

AAA module 39A of NAS 8A and RADIUS server 14 operate in a client-server relationship. NAS 8A may periodically send requests to RADIUS server 14 to perform application-to-application keep-alive and event notification. Each keep-alive request includes an origin state identifier parameter that, in accordance with techniques of this disclosure, is used to trigger the server (e.g., RADIUS server 14) to perform the bulk client state discovery mechanism described herein. In some examples, fault tolerance module 33 generates the keep-alive requests and processes the responses to the sent keep-alive request. RADIUS server 14 receives the keep-alive requests, examines the value of the origin state identifier parameter, and sends a response to NAS 8A. RADIUS server 14 may compare the value of the origin state identifier parameter of the received keep-alive request to a stored value that corresponds to the value of the origin state identifier parameter of a previously received request (i.e., a request received prior to when RADIUS server 14 received the most recent request).

If fault tolerance module 33 does not receive a proper response to keep-alive requests from RADIUS server 14 (e.g., within a configurable amount of time), fault tolerance module 33 determines that RADIUS server 14 is unreachable (e.g., because it crashed, lost network connectivity, etc.). When generating the next keep-alive request following the determination that RADIUS server 14 is unreachable, fault tolerance module 33 changes the value of the origin state identifier parameter. Fault tolerance module 33 sends the newly generated keep-alive requested having the changed value of the origin state identifier parameter to RADIUS server 14. When RADIUS server 14 is reachable by NAS 8A and receives the newly generated keep-alive request, RADIUS server 14 compares the value of the origin state identifier parameter to the stored value that corresponds to the value of the origin state identifier parameter of a previously received request. In this instance, the value of the origin state identifier parameter included in the currently received keep-alive request is different than the stored value, which acts as an implicit discovery request to trigger RADIUS server 14 to initiate the bulk client state discovery procedures. In this manner, NAS 8A may trigger RADIUS server 14 to preform the client state discovery mechanism using link management protocol extension requests (e.g., keep-alive requests).

During the bulk client state discovery process, NAS 8A receives a discovery request from RADIUS server 14. Session control module 35 of subscriber management service unit 32 processes the discovery request and determines which sessions match the criteria specified in the discovery request. As described above, the discovery request includes a session identifier. Session control module 35, in one example, identifies a set of sessions that have a session identifier that is lexicographically greater than the session identifier included in the discovery request. In one example, session control module 35 walks through active session contexts 37 to identify the matching sessions and retrieve information for each of the matching sessions. Session control module 35 generates a discovery response message that includes the retrieved information about the identified sessions. In some embodiments, each discovery response message may have a maximum size (e.g., a maximum number of bytes) and not all of the session information requested by RADIUS server 14 may fit in a single discovery response message.

If the number of sessions included in the identified set of sessions is greater than the number of sessions that fit in a single discovery response message, session control module 35 includes a first portion of the identified set of sessions in the discovery response message. The first portion, in one example, includes the portion of sessions that have session identifiers lexicographically closest to and greater than the session identifier included in the discovery request message. In one example, if the session identifier included in the discovery request message is the value " " (i.e., an empty string) and information about three sessions fit in a single discovery response message, session control module 35 includes information about the sessions that have session identifiers of "1", "2", and "3" as all session identifiers stored by NAS 8A are lexicographically greater than an empty string.

As described above, each discovery response message includes a result-code parameter. When RADIUS server 14 requests more session information than fits in a single discovery response message, session control module 35 sets the result-code parameter to a value that indicates "limited success." In other words, session control module 35, using the result-code parameter, notifies RADIUS server 14 that addition session information met the criteria of the discovery request message, but could not be included in the current discovery response because it did not fit.

When RADIUS server 14 receives a discovery response message that includes a result-code parameter that indicates "limited success," RADIUS server 14 generates a new discovery request message and set the search criterion to the session identifier of the last session for which information was included in the received discovery response message. Continuing the example above, the discovery response message includes information about sessions having session identifiers of "1", "2", and "3" and the result-code parameter indicates "limited success." Thus, RADIUS server 14 generates a new discovery request and sets the search criterion value to "3."

NAS 8A receives the new discovery request and session control module 35 generates a new discovery response that includes information about sessions having a session identifier greater than "4". The process continues until all of the requested session information is sent to RADIUS server 14. Session control module 35 notifies RADIUS server 14 that the last discovery response message is, in deed, the last discovery response message by setting the result-code parameter to a value that indicates "success."

Figure 3:
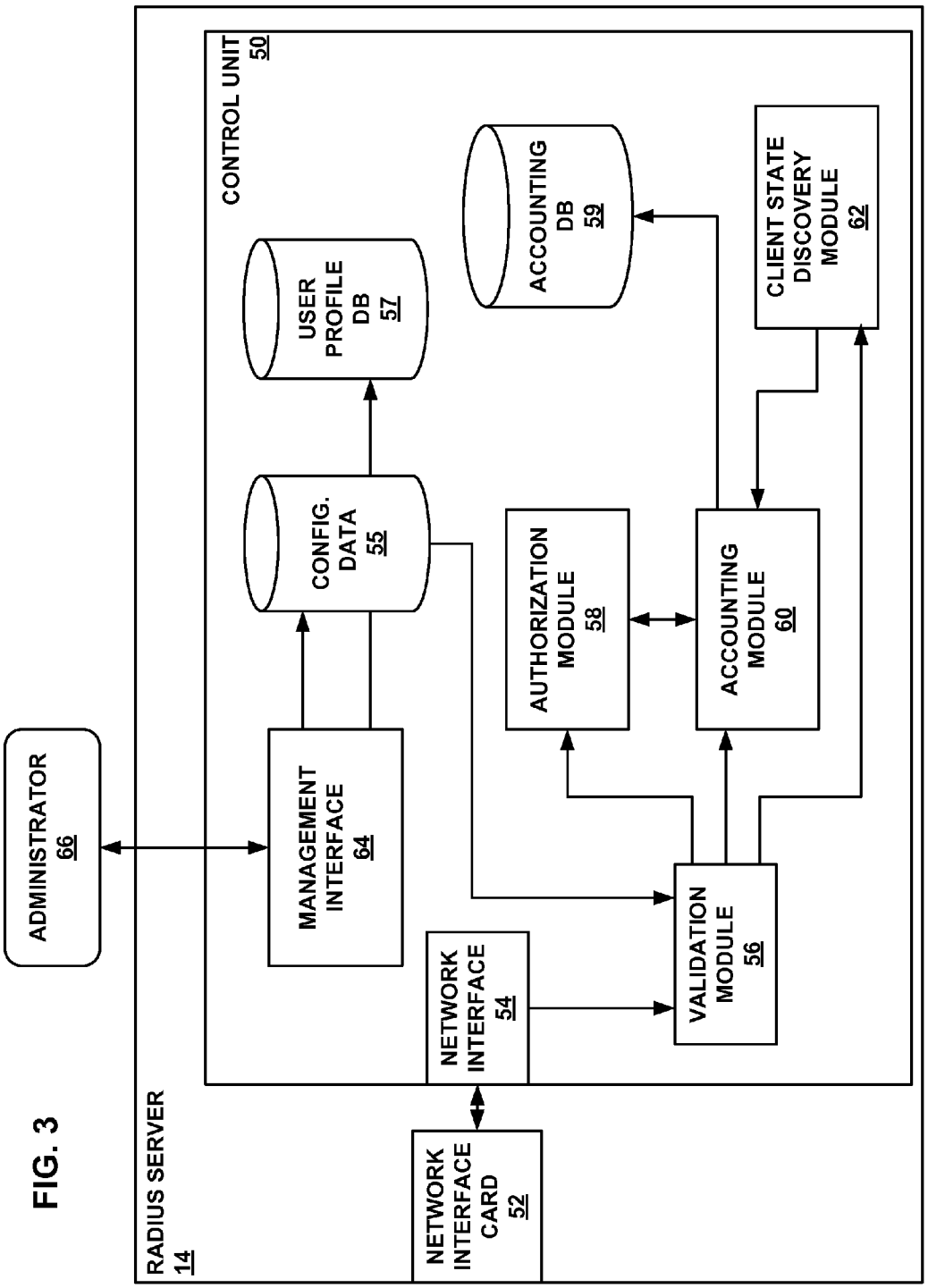
FIG. 3 is a block diagram illustrating an example RADIUS server that supports a bulk client state discovery mechanism in accordance with techniques described in this disclosure.

FIG. 3 is a block diagram illustrating an example RADIUS server that supports a bulk client state discovery mechanism in accordance with techniques described in this disclosure. RADIUS server 14 includes control unit 50 and network interface card 52. Operation of RADIUS server 14 is described in the context of network system 2 of FIG. 1.

Control unit 50 of RADIUS server 14 provides an operating environment for executing modules, which in the illustrated example include network interface 54, authorization module 58, accounting module 60, and management interface 64. Control unit 30 may include one or more processors (not shown), including one or more microprocessors, digital signal processors (DSPs), application specific integrated circuits (ASICs), field programmable gate arrays (FPGAs), or any other equivalent integrated or discrete logic circuitry, as well as any combinations of such components, to execute modules that implement the functionality described herein. In this example, control unit 30 also includes computer-readable storage media to store configuration data 55, user profile database 57 (illustrated as "user profile DB 40"), and accounting database 59 (illustrated as "accounting DB 42") data structures, which may include flat files, databases, tables, trees, and/or lists, for example.

Administrator 50 represents a network service provider entity (e.g., a human or software agent) that invokes management interface 48 to configure RADIUS server 14 with configuration data of configuration data 55 and user profiles of user profile database 57. Management interface 48 may present a front-end interface, such as a web-based or other graphical user interface or a command-line interface, to allow administrator 50 to enter configuration data. Management interface 48 may present an LDAP configuration interface for configuring and retrieving user profiles from user profile database 57. Management interface 48 may also execute Simple Network Management Protocol to enable monitoring and configuration by administrator 50.

Administrator 50 invokes management interface 48 to add RADIUS client information to configuration data 55 for each client of RADIUS server 14, such as each of NASes 8 of FIG. 1. RADIUS client information for any of NASes 8 may include the NAS network address and a RADIUS shared secret used to validate communications between RADIUS server 14 and the NAS.

User profile database 57 stores user profiles for subscribers. A user profile may include a corresponding subscriber user name and password and/or other authentication credentials, as well as the subscriber's authorization and/or connection parameters. In some examples, user profile database 57 is a remote database to which RADIUS server 14 issues authentication and authorization requests to receive an authentication indication (e.g., accept or reject) as well as authorization and/or connection parameters.

Accounting database 59 stores subscriber accounting information for RADIUS server 14 operating as a RADIUS accounting server. Accounting database 59 may include a structured query language (SQL) database. In some examples, accounting database 59 is a remote database to which RADIUS server 14 issues queries to add or modify subscriber accounting information.

Network interface card 32 exchanges network packets that carry RADIUS protocol messages with one or more NASes 8 connected to network interface card 32 by network links. Network interface card 32 exchanges network packets with network interface 34 of control unit 30. User Datagram Protocol (UDP) datagrams carry RADIUS protocol messages. Network interface 34 implements a network stack to receive UDP messages sent to a port assigned to RADIUS and provides application data in the form of RADIUS protocol request packets to authorization module 58 and accounting module 60 for processing after threshold validation of the RADIUS protocol messages by validation module 56. Similarly, network interface 34 uses the network stack to encapsulate RADIUS reply packets in UDP datagrams for output by network interface card 32 to NASes 8.

Example RADIUS protocol request packets include Access-Request messages sent by a RADIUS client to request authentication and authorization for a service connection and Accounting-Request messages sent by a RADIUS client to specify accounting information for a service connection that has been established by the RADIUS client. Network interface 34 provides each RADIUS protocol request packet to validation module 56, which performs RADIUS client validation of the packet by confirming that the request authenticator included therein specifies the shared secret configured in alias 38 for the source network address of the RADIUS protocol request message. If RADIUS client validation fails, the packet is silently ignored/dropped. Upon successful RADIUS client validation, validation module 56 passes the RADIUS protocol request message to authorization module 58 (in the case of an Access-Request message) or to accounting module 60 (in the case of an Accounting-Request message).

Authorization module 58 processes an Access-Request message from NAS 8A by querying user profile database 57 to obtain credentials for the subscriber requesting access and attempting to validate the subscriber against the credentials. If authorization fails, authorization module 58 returns an Access-Reject message to NAS 8A. If authorization is successful, authorization module 58 returns an Access-Accept message to the NAS 8A.

In addition to a subscriber user name and credentials, the Access-Request message includes one or more attributes. Specifically, the Access-Request message includes at least one network access server (NAS) identifier (e.g., a NAS-IDentifier value and/or a NAS-IP-Address value) for NAS 8A and may in some cases include an Acct-Session-Id, as well as other attributes. When the Access-Request message includes an Acct-Session-Id and authorization is successful, authorization module 58 may in some cases access a session record by creating the session record in accounting database 59 for the authorized session to be established by NAS 8A. In this way, authorization module 58 creates the session record such that the session may be identified based on the Acct-Session-Id and the NAS identifier for NAS 8A.

Like an Access-Request message, an Accounting-Request message issued by NAS 8A, for instance, and received by RADIUS server 14 must include at least one NAS identifier and must also include an Acct-Session-Id that uniquely identifies one of active sessions contexts 10A (and the corresponding session) of NAS 8A, as well as other attributes that carry accounting information for storage to accounting database 59. If the Accounting-Request message is a valid request, accounting module 60 accesses a session record to retrieve the session record in accounting database 59 for the session using a combination of the Acct-Session-Id and the NAS identifier. Accounting module 60 may then modify the session record using the accounting information carried by the Accounting-Request message. Modifying a session record using the accounting information may include adding a log entry to accounting database 59 that references the session record. RADIUS server 14 may create, retrieve, modify, and delete a session record in accounting database 59 upon receiving Accounting-Request messages from NAS 8A that include the Acct-Session-Id for the session.

Should RADIUS server 14 crash, reboot, or otherwise become unavailable, control unit 30 determines that RADIUS server became unavailable and client state discovery module 62 automatically initiates the bulk client state discovery techniques described herein. Client state discovery module 62 sends accounting module 60 a message that causes accounting module 60 to retrieve a session identifier and a corresponding NAS identifier from accounting DB 42 for each unique NAS identifier stored in accounting DB 42 (e.g., for each one of NASes 8). In some instances, accounting module 60 then deletes the session information stored in accounting DB 42. The session identifier retrieved from accounting DB 42 may, in some examples, be the lowest value (e.g., lexicographically lowest value) stored in accounting DB 42. For each NAS, client state discovery module 62 generates a discovery request message having the value of the search criterion parameter set to an empty string and the value of the discovery-type parameter set to a value that indicates a bulk-type discovery request.

RADIUS server 14 sends a generated discovery request message to each of NASes 8 based on the NAS identifier associated with each respective session identifier retrieved from accounting DB 42. Each respective NAS 8 generates a discovery response message based on the discovery request message, as described above, and sends the discovery response message to RADIUS server 14. Client state discovery module 62 process the received discovery response message and determines whether to generate additional discovery request messages based on the value of the result-code parameter included in each discovery response message. When the result-code parameter is set to a value that indicates that the sending one of NASes 8 encountered an error, client state discovery module 62 generates a new discovery request message that includes the same search criterion as the previously sent discovery request message (i.e., the discovery request message that caused the respective NAS 8 to send the discovery response message that included the error indication in the result-code parameter). When the result-code parameter is set to a value that indicates that "success" or "limited success," client state discovery module 62 extracts the session information from the discovery response message and passes it to accounting module 60. Accounting module 60 stores the session information in accounting DB 42. If the result-code parameter is set to a value that indicates "limited success," client state discovery module 62 generates a new discovery request message having a discovery type of "bulk" and a search criterion set to the value of the greatest session identifier included in the received discovery response message. If the result-code parameter is set to a value that indicates "success," client state discovery module 62 determines that all session information has been received from the respective one of NASes 8 and determines that no additional discovery request messages currently need to be generated and sent to the respective one of NASes 8. In some embodiments, client state discovery module 62 may be configured to sent a discovery request message that includes a discovery type of "done" to notify the respective one of NASes 8 that the current instance of the bulk client state discovery process is complete.

Figure 4:
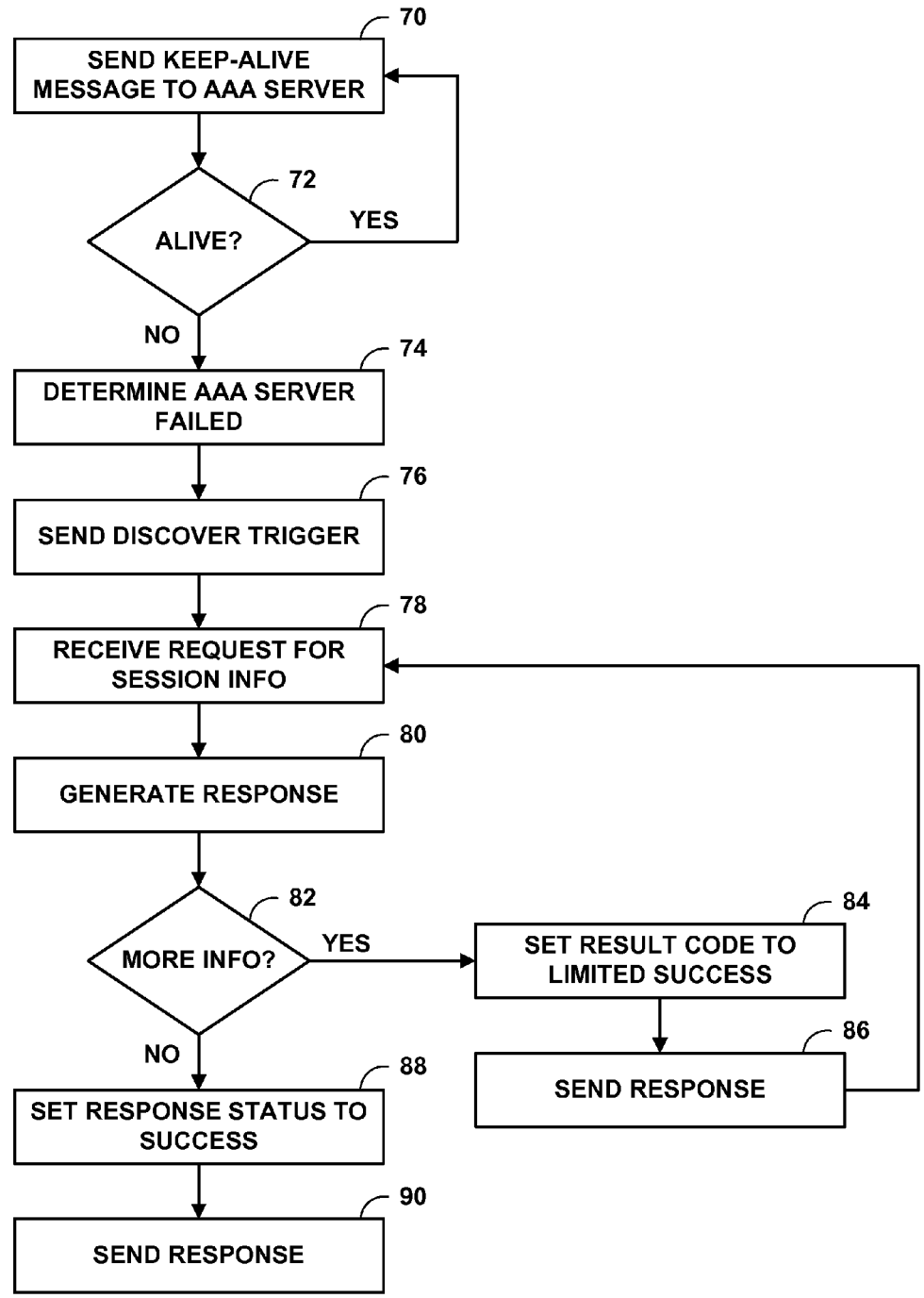
FIG. 4 is a flowchart illustrating an example mode of operation for a network access server that supports a bulk client state discovery mechanism according to techniques described herein.

FIG. 4 is a flowchart illustrating an example mode of operation for a network access server that supports a bulk client state discovery mechanism in accordance with techniques described in this disclosure. For purposes of illustration only, the example mode of operation shown in FIG. 4 will be described with respect to network system 2 of FIG. 1 and NAS8A of FIG. 2. One or more example operations in the illustrated mode of operation may be optional and may not be required to perform the bulk client state discovery mechanism described in this disclosure.

In the example operation shown in FIG. 4, NAS 8A and RADIUS server 14 are configured to be communicatively coupled and exchange subscriber session information as described above. NAS 8A sends periodic keep-alive messages to RADIUS server 14, in part, to verify that RADIUS server 14 is reachable by NAS 8A over a network (70). The keep-alive messages include an origin state identifier field that maintains a static value unless or until RADIUS server 14 is not reachable by NAS 8A. NAS 8A monitors responses to the keep-alive message to determine whether RADIUS server 14 is reachable by NAS 8A (72). As long as a response message corresponding to a keep-alive message is received within a configurable amount of time ("YES" branch of 72), NAS 8A determines that RADIUS server 14 is reachable from NAS 8A and continues normal operation, including sending keep-alive message. If a response to a keep-alive message is not received within a configurable amount of time ("NO" branch of 72), NAS 8A determines that RADIUS server 14 is unreachable by NAS 8A (e.g., that RADIUS server 14 failed) (74).

When NAS 8A determines that RADIUS server 14 has failed (74), NAS 8A modifies an origin state identifier parameter of the next generated keep-alive message and sends the modified keep-alive message to RADIUS server 14 as a discovery trigger (76). When NAS 8A receives responses to each keep-alive request, NAS 8A continues to generate keep-alive message in which the origin state identifier parameter is set to the same value as the previously send keep-alive message. When NAS 8A determines that RADIUS server 14 has failed (74), NAS 8A changes (e.g., increments) the value of the origin state identifier parameter of the next keep-alive message. When RADIUS server 14 receives the keep-alive message with the updated value of the origin state identifier parameter (e.g., once RADIUS server 14 is reachable from NAS 8A), RADIUS server 14 automatically triggers the bulk client state discovery mechanism described in this disclosure.

Responsive to sending the keep-alive message with the updated origin state identifier parameter, NAS 8A receives a discovery request message from RADIUS server 14 (78). The discovery request message includes a search criterion parameter that NAS 8A uses to identify a plurality of sessions maintained by NAS 8A for which RADIUS server 14 is requesting information and a discovery type parameter that indicates that the message is a discovery request message. In one embodiment, a first discovery request message sent from RADIUS server 14 includes an empty string as the search criterion. In this embodiment, an empty string indicates that RADIUS server 14 is requesting information about all of the sessions currently maintained by NAS 8A. NAS 8A identifies the matching sessions and generates a discovery response message that includes the information for the identified sessions (80).

In one example, the discovery response message has a maximum size (e.g., a maximum number of kilobytes) such that only a portion of the requested session information fits within a single discovery response message (82). When the amount information about the requested sessions is greater than the amount of information that will fit in a single discovery response message ("YES" branch of 82), NAS 8A generates a first discovery response message that includes a portion of the requested session information, sets a result-code parameter of the discovery response message to a value that indicates "partial success" (84), and sets the discovery type parameter to a value that indicates that the message is a discovery response message. NAS 8A sends the discovery response message to RADIUS server 14.

RADIUS server 14 receives the discovery response message and, based at least in part on the value of the result-code parameter of the received discovery response message, determines that addition session information is available. RADIUS server 14 generates another discovery request message that includes a search criterion parameter set to the value of the lexicographically greatest session identifier included in the received discovery response message. NAS 8A receives the additional discovery request message (78) and generates a discovery response message based at least in part on the discovery request message (80). While there remains more session information that matches the search criterion included in the discovery request message than will fit in a single discovery response message ("YES" branch of 82), NAS 8A continues to generate discovery response messages that have the result-code parameter set to a value that indicates "limited success" (84) and send the discovery response messages to RADIUS server 14 (86).

When the session information for the sessions that match the search criterion fit in a single discovery response message ("NO" branch of 82), NAS 8A sets the value of the result-code parameter to a value that indicates "success" (88) and sends the discovery response message to RADIUS server 14 (90). RADIUS server 14, upon receiving the discovery response message that includes the "success" result code, may generate a discovery request message having a discovery type of "done" to notify NAS 8A that the current bulk client state discovery operation is complete.

Figure 5:
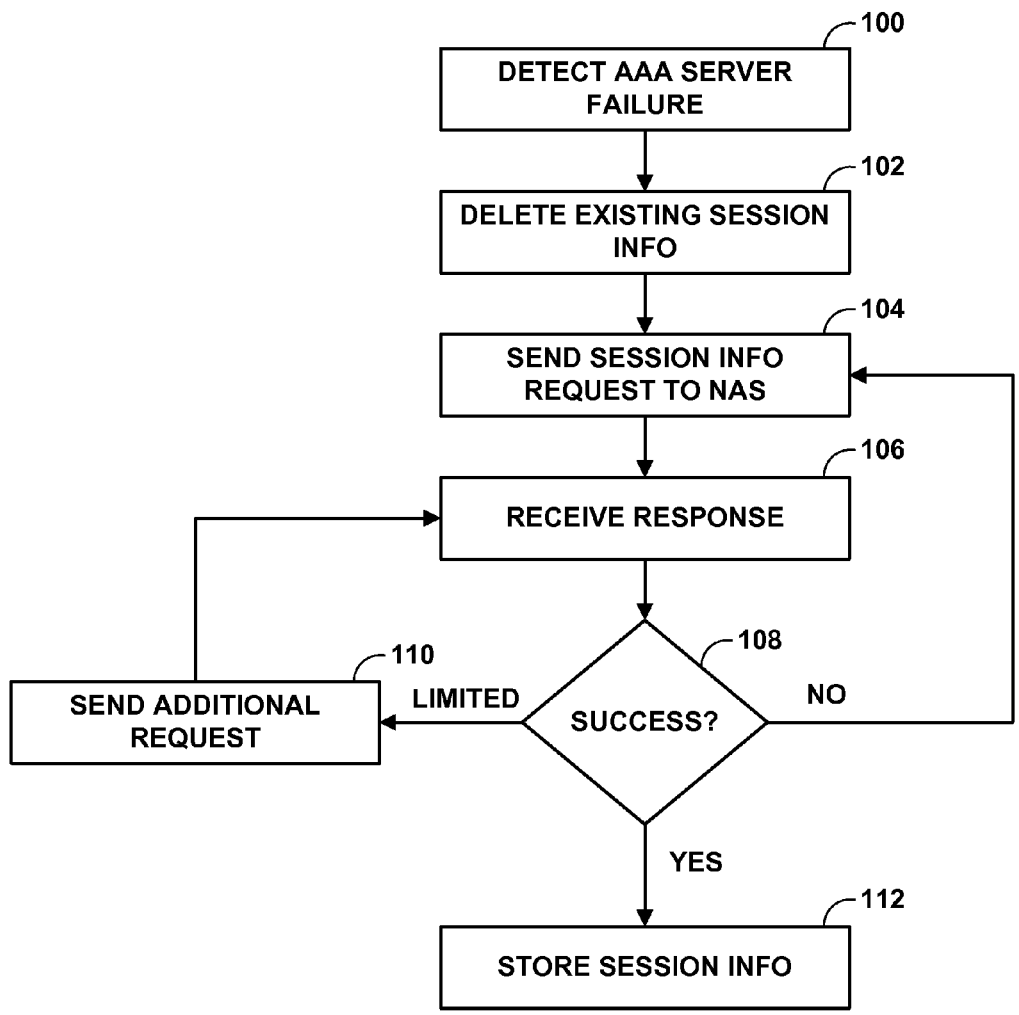
FIG. 5 is a flowchart illustrating an example mode of operation for a RADIUS server that supports a bulk client state discovery mechanism in accordance with techniques described in this disclosure.

FIG. 5 is a flowchart illustrating an example mode of operation for a RADIUS server that supports a bulk client state discovery mechanism according to techniques described herein. For purposes of illustration only, the example mode of operation shown in FIG. 5 will be described with respect to network system 2 of FIG. 1 and RADIUS server 14 of FIG. 3. One or more example operations in the illustrated mode of operation may be optional and may not be required to perform the bulk client state discovery mechanism described in this disclosure.

In general, RADIUS server 14 performs the bulk client state discovery operation in response to detecting that RADIUS server 14 lost network connectivity, crashed, or otherwise failed (100). However, in some instances, the bulk client state discovery operation may be initiated manually by an administrator (e.g., administrator 66 of FIG. 3). RADIUS server 14 may determine that RADIUS server 14 failed based on server state information, operational logs, configuration parameters, etc. In some examples, RADIUS server 14 may determines that RADIUS server 14 failed in response to receiving a keep-alive request from a NAS communicatively coupled to RADIUS server 14 (e.g., NAS 8A of FIG. 1) when the keep-alive request includes an origin state identifier parameter that is set to a different value than the last received keep-alive message.

In some examples, responsive to determining that RADIUS server 14 failed, RADIUS server 14 may delete all stored subscriber session information (e.g., all information stored in accounting DB 59) (102). Deleting all stored subscriber session information may enable RADIUS server 14 to refresh all subscriber session information and not maintain any expired or inaccurate subscriber session information. RADIUS server 14 generates a discovery request message that requests subscriber session information and sends a respective discovery request message to each NAS 8 (104). The discovery request message includes a search criterion parameter and a discovery type parameter. In examples where RADIUS server 14 deletes all stored session information, the search criterion parameter may be set to the value of an empty string, which may trigger the receiving one of NASes 8 to send all subscriber session information stored by the receiving one of NAS 8es to RADIUS server 14. The discovery type parameter may be set to one of three values that indicate a bulk-type discovery request, an exact-type discovery request, and a done-type discovery request. The bulk-type discovery request causes the receiving one of NASes 8 to send as much information about sessions that match the search criterion as will fit in a single discovery response message. That is, the discovery response message generated in response to a bulk-type discovery request message may include information about a plurality of sessions. The exact-type discovery request message causes the receiving one of NASes 8 to send information about the one session that matches the search criterion. The done-type discovery request message is an option discovery request message that is used to notify the receiving one of NASes 8 that the current bulk client state discovery operation is complete.

RADIUS server 14 receives a discovery response message from each of NASes 8 and determines whether the discovery response was a success (108). The discovery response messages include a result-code parameter that is set by the respective sending NAS 8 and indicates whether the respective NAS 8 was able to retrieve information for sessions matching the search criterion and whether there is additional information available for sessions that match the search criterion but is not included in the current discovery response. When the discovery response indicates that there was an error ("NO" branch of 108), RADIUS server 14 sends a discovery request message to the corresponding NAS 8 where the discovery request message includes the same search criterion as the discovery request message that was previously sent to the corresponding NAS 8. When the discovery response message indicates that it was a limited success ("LIMITED" branch of 108), RADIUS server 14 determines that additional subscriber information matches the previously sent search criterion and sends another discovery request message (110). The additional discovery request message includes the search criterion field set to the value of the lexicographically greatest session identifier included in the received discovery response message.

RADIUS server 14 receives the next discovery response message (i.e., generated and sent by the NAS 8 to which RADIUS server 14 send the additional discovery request message) and processes the next discovery response message as described above. RADIUS server 14 continues to send discovery request messages and received discovery response messages until the discovery response message includes the result-code parameter set to a value that indicates "success" ("YES" branch of 108). The "success" result code signals to RADIUS server 14 that no additional subscriber session information that matches the last search criterion is available. That is, the "success" result code indicates to RADIUS server 14 that all subscriber session information matching the search criterion included in the corresponding discovery request message is included in the current discovery response message. RADIUS server 14 stores all of the received session information (e.g., in accounting DB 59) (112). While illustrated in FIG. 5 as occurring after all discovery response messages are received by RADIUS server 14, RADIUS server 14 may store the session information included in each received discovery response message at any time, including prior to sending any additional discovery request messages.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor. Computer-readable storage medium does not include carrier waves, propagated signals, or other communication media.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following claims.

What is claimed is:

1. A method comprising:
    providing, with a network access device, network access to a plurality of subscribers upon authenticating the subscribers with an authentication, authorization, and accounting (AAA) server;
    storing, within the network access device, information for a plurality of subscriber sessions associated with the plurality of subscribers;
    sending a first keep alive message from the network access device to the AAA server, wherein the first keep alive message includes a trigger parameter, wherein the trigger parameter specifies an initial value;
    when a response to the first keep alive message is not received from the AAA server and by the network access device within a configurable amount of time, determining, with the network access device, that the AAA server is no longer reachable by the network access device;
    responsive to determining that the AAA server is not reachable by the network access device, sending a second keep alive message from the network access device to the AAA server, wherein the second keep alive message includes a different value for the trigger parameter to cause the AAA server to send a discovery request message to the network access device;
    receiving, with the network access device, the discovery request message from the AAA server, wherein the discovery request message includes a request for the information about one or more of the subscriber sessions;
    generating, with the network access device, a discovery response message that includes information about at least a portion of the plurality of subscriber sessions; and
    sending, with the network access device, the discovery response message to the AAA server.

2. The method of claim 1, wherein the received discovery request message specifies a search criterion, and wherein information about a maximum number of subscriber sessions fits in a single discovery response message, the method further comprising:
    identifying, based on the search criterion, a set of subscriber sessions having subscriber records currently stored within a database of the network access device; and
    determining whether a number of subscriber sessions included in the identified set of subscriber session is greater than the maximum number of subscriber sessions,
    wherein generating the discovery response message is based at least in part on whether the number of subscriber sessions included in the identified set of subscriber session is greater than the maximum number of subscriber sessions.

3. The method of claim 2, wherein, when the number of subscriber sessions included in the identified set of subscriber sessions is less than or equal to the maximum number of subscriber sessions, generating the discovery response message comprises:
    retrieving information about each subscriber session of the identified set of subscriber sessions from a database of the network access device; and
    generating the discovery response message, the discovery response message including the retrieved information about the set of subscriber sessions.

4. The method of claim 2, wherein, when the number of subscriber sessions included in the identified set of subscriber sessions is greater than the maximum number of subscriber sessions that can fit in the single discovery response message, generating the discovery response message comprises:
    identifying a portion of the identified set of subscriber sessions, wherein the portion of the identified set of subscriber sessions includes a number of subscriber sessions that is less than or equal to the maximum number of subscriber sessions;
    retrieving information about the portion of the identified set of subscriber sessions from a database of the network access device; and
    generating the discovery response message, the discovery response message including the retrieved information about the portion of the identified set of subscriber sessions.

5. The method of claim 2,
    wherein the generated discovery response message includes a result code that indicates success when the number of subscriber sessions included in the identified set of subscriber sessions is less than or equal to the maximum number of subscriber sessions that can fit in the single discovery response message, and
    wherein the generated discovery response message includes a result code that indicates limited success when the number of subscriber sessions included in the identified set of subscriber sessions is greater than the maximum number of subscriber sessions that can fit in the single discovery response message.

6. The method of claim 2, wherein identifying the set of subscriber sessions based on the search criterion comprises identifying subscriber sessions having a session identifier that is lexicographically greater than a value of the search criterion.

7. The method of claim 1, wherein the received discovery request message includes a search criterion, and wherein generating the discovery response message further comprises:
    identifying a set of subscriber sessions having a corresponding subscriber identifier that is lexicographically greater than a value of the search criterion included in the discovery request message.

8. The method of claim 1, the discovery request message and the discovery response message are each formatted in accordance with an authentication, authorization, and accounting protocol.

9. A network access device comprising:
    one or more network interfaces to send and receive packets associated with a plurality of subscriber session; and
    a subscriber management service unit having a database of subscriber records to store subscriber information for the subscribers sessions upon authenticating the subscribers with an authentication, authorization, and accounting (AAA) server,
    wherein the subscriber management service unit is configured to send a first keep alive message from the network access device to the AAA server, wherein the first keep alive message includes a trigger parameter, wherein the trigger parameter specifies an initial value, when a response to the first keep alive message is not received from the AAA server and by the network access device within a configurable amount of time, determine that the AAA server is no longer reachable by the network access device, responsive to determining that the AAA server is not reachable by the network access device, send a second keep alive message from the network access device to the AAA server, wherein the second keep alive message includes a different value for the trigger parameter to cause the AAA server to send a discovery request message to the network access device, receive the discovery request message from the AAA server using the network interface, wherein the discovery request message includes a request for information about a plurality of subscriber sessions, and generate a discovery response message that includes information about at least a portion of the plurality of subscriber sessions, and send the discovery response message to the AAA server using the network interface.

10. The network access device of claim 9,
wherein the received discovery request message includes a search criterion,
wherein information about a maximum number of subscriber sessions fits in a single discovery response message, and
wherein the subscriber management service unit further comprises:
  active session contexts configured to store subscriber session information; and
  a session control module configured to identify a set of subscriber sessions of the active session contexts that match the search criterion, determine whether a number of subscriber sessions included in the identified set of subscriber session is greater than the maximum number of subscriber sessions, and generate the discovery response message based at least in part on whether the number of subscriber sessions included in the identified set of subscriber session is greater than the maximum number of subscriber sessions.

11. The network access device of claim 10,
wherein the session control module is further configured to, when the number of subscriber sessions included in the identified set of subscriber sessions is less than or equal to the maximum number of subscriber sessions, retrieve, from the active session contexts, information about each subscriber session of the set of subscriber sessions, wherein the generated discovery response message include the received information about the set of subscriber sessions.

12. The network access device of claim 10,
wherein the session control module is further configured to, when the number of subscriber sessions included in the identified set of subscriber sessions is greater than the maximum number of subscriber sessions, identify a portion of the identified set of subscriber sessions, wherein the portion of the identified set of subscriber sessions includes a number of subscriber sessions that is less than or equal to the maximum number of subscriber sessions, and retrieve, from the active session contexts, information about the portion of the identified set of subscriber sessions, wherein the generated discovery response message includes the received information about the portion of the identified set of subscriber sessions.

13. The network access device of claim 11,
wherein the generated discovery response message includes a result code that indicates success when the number of subscriber sessions included in the identified set of subscriber sessions is less than or equal to the maximum number of subscriber sessions, and
wherein the generated discovery response message includes a result code that indicates limited success when the number of subscriber sessions included in the identified set of subscriber sessions is greater than the maximum number of subscriber sessions.

14. The network access device of claim 9,
wherein the received discovery request message includes a search criterion, and
wherein the subscriber management service unit comprises a session control module configured to identify a set of subscriber sessions having a corresponding subscriber identifier that is lexicographically greater than a value of the search criterion included in the discovery request message.

15. A computer-readable storage device encoded with instructions for causing one or more processors of a network access device to:
  provide network access to a plurality of subscribers upon authenticating the subscribers with an authentication, authorization, and accounting (AAA) server;
  store information for a plurality of subscriber sessions associated with the plurality of subscribers;
  send a first keep alive message from the network access device to the AAA server, wherein the first keep alive message includes a trigger parameter, wherein the trigger parameter specifies an initial value;
  when a response to the first keep alive message is not received from the AAA server and by the network access device within a configurable amount of time, determine that the AAA server is no longer reachable by the network access device;
  responsive to determining that the AAA server is not reachable by the network access device, send a second keep alive message to the AAA server, wherein the second keep alive message includes a different value for the trigger parameter to cause the AAA server to send a discovery request message to the network access device;
  receive the discovery request message from the AAA server, wherein the discovery request message includes a request for information about a plurality of subscriber sessions;
  generate a discovery response message that includes information about at least a portion of the plurality of subscriber sessions; and
  send the discovery response message to the AAA server.

* * * * *